(12) United States Patent
Glynn et al.

(10) Patent No.: US 7,448,157 B2
(45) Date of Patent: Nov. 11, 2008

(54) HARPOON DEVICE AND METHODS OF USE

(75) Inventors: Kevin B. Glynn, Fort Lauderdale, FL (US); Christopher Godino, Waban, MA (US)

(73) Assignee: Offshore Innovations, Inc., Falmouth, MA (US)

( * ) Notice: Subject to any disclaimer, the term of this patent is extended or adjusted under 35 U.S.C. 154(b) by 0 days.

(21) Appl. No.: 11/583,613

(22) Filed: Oct. 19, 2006

(65) Prior Publication Data

US 2007/0089348 A1    Apr. 26, 2007

Related U.S. Application Data

(60) Provisional application No. 60/728,513, filed on Oct. 20, 2005.

(51) Int. Cl.
*A01K 81/04* (2006.01)

(52) U.S. Cl. .............................. 43/6; 294/126

(58) Field of Classification Search ........... 43/6, 43/5; 294/126
See application file for complete search history.

(56) References Cited

U.S. PATENT DOCUMENTS

| | | | | |
|---|---|---|---|---|
| 17,370 | A * | 5/1857 | Grudchos | 43/6 |
| 18,458 | A * | 10/1857 | Kelly | 43/6 |
| 206,694 | A * | 8/1878 | Taylor | 43/6 |
| 947,990 | A * | 2/1910 | Harbeck | 294/126 |
| 1,302,457 | A * | 4/1919 | Ureck | 43/5 |
| 1,442,813 | A * | 1/1923 | Lobit | 43/6 |
| 1,581,321 | A * | 4/1926 | Raithel | 43/6 |
| 2,090,731 | A * | 8/1937 | Klein | 43/6 |
| 2,194,618 | A * | 3/1940 | Scramlin | 43/6 |
| 2,212,345 | A * | 8/1940 | Krieger | 43/6 |
| 2,236,427 | A * | 3/1941 | Garrison | 43/6 |
| 2,442,974 | A * | 6/1948 | Frederiksen | 43/6 |
| 2,590,595 | A * | 3/1952 | Ziebell | 43/5 |
| 2,616,201 | A * | 11/1952 | Roosevelt | 43/6 |
| 2,659,273 | A * | 11/1953 | Trautmann | 43/6 |
| 2,770,905 | A * | 11/1956 | Efraimson | 43/6 |
| 2,796,691 | A * | 6/1957 | Norris | 43/6 |
| 2,812,756 | A * | 11/1957 | Myers | 43/6 |
| 2,839,862 | A * | 6/1958 | Hanshaw | 43/6 |
| 2,951,306 | A * | 9/1960 | Woodfield | 43/6 |
| 2,957,468 | A * | 10/1960 | Enfield | 43/6 |
| 3,004,362 | A * | 10/1961 | Day | 43/6 |
| 3,045,659 | A * | 7/1962 | Malcolm | 43/6 |
| 3,050,897 | A * | 8/1962 | Pitts | 43/6 |
| 3,071,883 | A * | 1/1963 | Rudolf | 43/6 |
| 3,072,428 | A * | 1/1963 | Johnson | 43/6 |
| 3,150,460 | A * | 9/1964 | Dees | 43/6 |
| 3,210,880 | A * | 10/1965 | Grenier | 43/6 |
| 3,680,243 | A * | 8/1972 | Braun | 43/6 |
| 3,715,828 | A * | 2/1973 | Johnson et al. | 43/6 |

(Continued)

FOREIGN PATENT DOCUMENTS

FR    2204292 A  *  6/1974

(Continued)

*Primary Examiner*—Darren W Ark
(74) *Attorney, Agent, or Firm*—Sonia K. Guterman; Lawson & Weitzen, LLP (57) ABSTRACT

A harpoon device is provided which has attachable components, including a plurality of lengths of shaft segments joined by a coupler and a variety of functional units.

11 Claims, 7 Drawing Sheets

U.S. PATENT DOCUMENTS

| | | | | |
|---|---|---|---|---|
| 3,766,678 A * | 10/1973 | Reaves | ............... | 43/6 |
| 3,878,788 A * | 4/1975 | Ah Sam | ............... | 43/6 |
| 3,932,953 A * | 1/1976 | Sharp | ............... | 43/6 |
| 4,001,963 A * | 1/1977 | Hamsley | ............... | 43/6 |
| 4,004,539 A * | 1/1977 | Wesson | ............... | 43/5 |
| 4,052,808 A * | 10/1977 | Crabtree | ............... | 43/6 |
| 4,169,330 A * | 10/1979 | Schnur | ............... | 43/5 |
| 4,209,929 A * | 7/1980 | Mishima | ............... | 43/6 |
| 4,232,422 A * | 11/1980 | Fellmann | ............... | 16/427 |
| 4,429,480 A * | 2/1984 | Stude | ............... | 43/6 |
| 4,624,068 A * | 11/1986 | Howard, III | ............... | 43/6 |
| 4,718,189 A * | 1/1988 | Stude | ............... | 43/6 |
| 4,720,933 A * | 1/1988 | Stude | ............... | 43/6 |
| 4,839,979 A * | 6/1989 | Rogers | ............... | 43/6 |
| 5,243,778 A * | 9/1993 | Henley | ............... | 43/6 |
| 5,566,858 A * | 10/1996 | Ducker, III | ............... | 43/6 |
| 5,600,914 A * | 2/1997 | Tatar | ............... | 43/6 |
| 5,704,156 A * | 1/1998 | DiLello | ............... | 43/5 |
| 5,832,651 A * | 11/1998 | Arntz | ............... | 43/5 |
| 6,550,178 B1 * | 4/2003 | Rogers | ............... | 43/6 |
| 6,678,989 B1 * | 1/2004 | Lowe | ............... | 43/6 |
| 6,789,346 B1 * | 9/2004 | Holler | ............... | 43/6 |
| 6,883,264 B1 * | 4/2005 | Gimbel | ............... | 43/6 |
| 2007/0084103 A1 * | 4/2007 | Rogers et al. | ............... | 43/6 |

FOREIGN PATENT DOCUMENTS

| | | | | |
|---|---|---|---|---|
| FR | 2458998 | A1 * | 2/1981 | |
| FR | 2758878 | A1 * | 7/1998 | |
| FR | 2879733 | A1 * | 6/2006 | |
| FR | 2881615 | A1 * | 8/2006 | |
| JP | 05115233 | A * | 5/1993 | |
| JP | 2002360122 | A * | 12/2002 | |
| KR | 2006036422 | A * | 4/2006 | |
| RU | 2093983 | C1 * | 10/1997 | |
| WO | WO 2100169 | A1 * | 12/2002 | |

* cited by examiner

HARPOON DEVICE AND METHODS OF USE

RELATED APPLICATION

The present applications claims the benefit of U.S. provisional application entitled, "Harpoon Device and Methods of Use", having Ser. No. 60/728,513, filed on Oct. 20, 2005, and which is hereby incorporated by reference herein in its entirey.

TECHNICAL FIELD

This invention relates to devices for contacting animals such as a fishing harpoon device.

BACKGROUND OF THE INVENTION

The harpoon is one of the oldest hunting tools known to man having been developed by prehistoric people as a variation to the spear. Originally, the harpoon was hand thrown like a spear and had an arrow-like head, with a line attached in order to retrieve an animal, and was used particularly in the hunting of whales and marine animals, such as sharks, billfish and tuna. Over thousands of years the same basic design of the harpoon was maintained.

With the rise of commercial whaling in the 1800's various new designs of harpoons became available. Most harpoons of this era were constructed of a wooden handle and an iron head. The arrow shaped head was allowed to pivot 90 degrees, once the harpoon penetrated the catch. A harpoon design included attachment to a line for hauling the catch of the fishing vessel.

With increased development in commercial fishing and sport fishing since the 1960's, new designs of harpoon were developed, mostly constructed of wood and aluminum. The recent changes in harpoon development include use of aluminum shafts, weighted heads and detachable darts (arrows).

Recent harpoons have lengths in the range of about 8 to about 10 feet, and are constructed as single articles of manufacture. As harpoons became more popular in the sport fishing industry as an accessory to rod and reel fishing to land large fish, new streamlined harpoons were developed. As most are one piece, it is cumbersome to stow the large harpoon on a small non-commercial vessel.

SUMMARY

A quick-assembling sturdy multi-piece harpoon is desirable to suit the storage needs for smaller vessels. An embodiment of the invention provided herein is a harpoon device having separable components comprising: a shank having a proximal end and a distal end, such that the distal end of the shank is attachable to a dart, a gaff, a tagging stick, knife, blade, brush or other functional tip, and the dart, gaff, tagging stick, knife, blade, brush or other functional tip is further attachable to a line. The harpoon device further includes a power head having a proximal end and a distal end such that the distal end of the head is attachable to the proximal end of the shank; still further including a shaft having a distal end and a proximal end, such that the shaft comprises a plurality of hollow shaft segments, such that each segment is identically threaded on inner surfaces of segment ends, the segments being reversibly attachable by a coupler threaded on inner surfaces of the coupler ends, each end of the segments being attachable by a coupler threaded on outer surfaces of the coupler ends, such that the inner diameter of the shaft is sufficiently greater than the outer diameter of the coupler and the coupler joins segments by a rotational screw mechanism, and such that the shaft segments are selected from at least one of a plurality of long segments and short segments; and a cap attachable to the proximal end of the shaft, the cap having a clip for securing the line.

In a related embodiment, attachment of the components to each other is free of rivets. In another related embodiment, the shaft comprises a material selected from the group of: aluminum, titanium, acrylic, stainless steel, and a composite. In a related embodiment, the head comprises a material selected from the group of brass, chrome and stainless steel. Further, the head weighs at least about 0.5 pound, for example, the head weighs at least about 0.4 pound, or about 1.0 pound, or about 1.5 pounds, or about 2.0 pounds, or about 5.0 pounds.

The harpoon device has interchangeable short and long shaft segments, so that for example, the short shaft segment is about two feet in length, however equivalent short shaft segments are envisioned, for example, 1.8 feet or 2.2 feet in length. Further, the long shaft segment is about four feet in length. The shaft is conveniently and rapidly assembled using the coupler and, in various alternative embodiments, has at least one short segment or at least one long segment; or the shaft includes one short segment and one long segment; or the shaft includes two long segments; or the shaft has three short segments. The number and length of segments is determined by the user according to standards of suitability and ease of use based on the size of the user.

In general, the outer surface of at least one shaft segment has been manufactured to have a rough gripping surface that allows the user to have more control during the delivery and capture motions, and assists in increasing the accuracy of handling and positioning of the device during motion. This is accomplished by sandblasting at least one of the segments prior to coating that segment. While the textured grip is in certain embodiments located along the entire length of the surface of a shaft segment, the granular, sandblasted texture is alternatively limited to a desired portion, for instance in a striped pattern along the entire length of the shaft or a circular (annular) or helical pattern along a portion of the shaft or along the entire shaft.

Another embodiment of the invention provided herein is a harpoon device having a shaft comprising attachable segments, so that at least one of the segments has an area of longitudinal non-smooth gripping surface. The shaft comprises a distal end and a proximal end, the distal end attachable to a head having a functional unit, e.g., a dart, gaff, knife, blade, brush or tagging stick attachable to the shaft by an attachable shank; the proximal end of the shaft having an attachable clip for securing a line attachable to the dart, gaff, knife, blade, brush or tagging stick, such that the line is removably attached to the shaft, such that following contacting the device to an animal, activity of the animal removes attachment to the shaft, and the shaft remains secured to the line by the clip, for recovering the shaft and the animal.

Another embodiment of the invention provided herein is a method of constructing a harpoon device, the method including providing a rough gripping surface, for example, by sandblasting at least one of the segments of the shaft, such that a sandblasted segment provides a proximal end of the shaft with a gripping surface; electroplating the sandblasted segment; and assembling the components.

Another embodiment of the invention provided herein is a method of retrieving a marine animal such as a fish from the water with any of the harpoon devices above, the method having the steps: attaching a first end of the line reversibly to the shaft of the device and securing a second end of the line through the clip, such that the line is slidably attached through the clip to a buoy for locating the device; contacting the animal or fish with the device, such that the dart, gaff, knife, blade, brush or tagging stick enters the fish, and such that motion of the animal, i.e., the fish, detaches the line from the shaft; and retrieving the fish and recovering the harpoon device.

In a related embodiment, this method further includes, prior to attaching the line, assembling the device from the components.

In a related embodiment, assembling the device further includes choosing long and short segments, such that a smaller user chooses at least one short segment and a taller user chooses at least one long segment.

Another embodiment of the invention herein is a kit for a harpoon device including: a dart, gaff, knife, blade, brush or tagging stick; a power head; a shank; a plurality of hollow, cylindrical shaft segments selected from long and short segments; and a coupler. The kit in various embodiments further can have a carrying bag. The kit in certain embodiments has the bag with a flexible, ventilated mesh material. The kit in certain embodiments has the bag which is compartmentalized into a plurality of chambers. Further in related embodiments, the plurality of chambers has at least a chamber for the power head and a chamber for the shank. In a related embodiment, the chamber for the power head is centrally located along the length of the bag. Further, the chambers in related embodiments are closable with a Velcro-type fastener.

DETAILED DESCRIPTION

An object of this invention is to provide a less bulky, easy to handle harpoon device that uses multiple shaft pieces without sacrificing strength or durability. Prior harpoon shafts are connected by pins, screws or rivets which fail to withstand the weight of large fish or animals without breaking. The construction design of the present invention employs an optimally secure connection of lengthy reinforcement and rigidity to the shaft compared to prior methods. This new, improved design does not dislodge or snap under normal use and better withstands the tension, pressure and punishment of capturing animals of considerable size and weight.

Another disadvantage of available harpoons is that their functionality is limited to penetration of the skin or hide of a target fish or large animal. For hoisting a large fish onto a boat or dock, a common procedure is to switch to use of a different article of fishing equipment to remove the fish from the water. The present invention provides a harpoon head to be used with an interchangeable functional unit such as a dart, a gaff, a tagging stick, knife, blade, brush or other implement to accommodate virtually any useful attachment, and with the advantage of taking up minimal space on a boat, dock or storage area.

A further object of the invention is to provide a device that has a plurality of attachable components, and is easy to assemble so that a user may do so in a typical fishing environment often characterized by a rocking boat, stormy weather and time pressure of having only a moment's notice.

Another object of the invention is to provide a harpoon having a sufficiently rough and tactile grip surface along a length of the shaft, unlike commonly used harpoon tools comprising either foam-material placed along certain portions of the harpoon shaft or smooth surfaces along the entire length, each posing the problems of having limited gripping capability or a small gripping surface area.

The invention includes a carrying bag which enhances the convenience of the segmented harpoon device by preventing loss of components, and minimizing internal movement of components in the bag, and possible rupture of the bag.

These and other features, advantages and objects of the present invention will be further understood and appreciated by those skilled in the art by reference to the following specification, claims and drawings.

Now the articles, kits and methods of the present invention shall be described in detail, with reference to the drawings herein.

In an embodiment of the invention, a new and improved harpoon device (FIG. 1) includes a power head (101) having a proximal end (102) and a distal end (103) wherein the powerhead (101) has an overall weight considerably heavier than conventional harpoon heads on the market. The heavy weighted head member (101) of the harpoon (FIG. 1) provides the means of impelling or thrusting the device in a desirable trajectory with limited deflection. The powerhead (FIG. 4) is manufactured from a metal material such as brass, chrome, steel, stainless steel, aluminum, brass, copper, or from a plastic or a fiber, and may include an electroplating process to prevent the powerhead (FIG. 4) from developing corrosion or rust inside the powerhead area (402) without loss of power provided by the heaviness of the weighted head (402).

Figure 6:
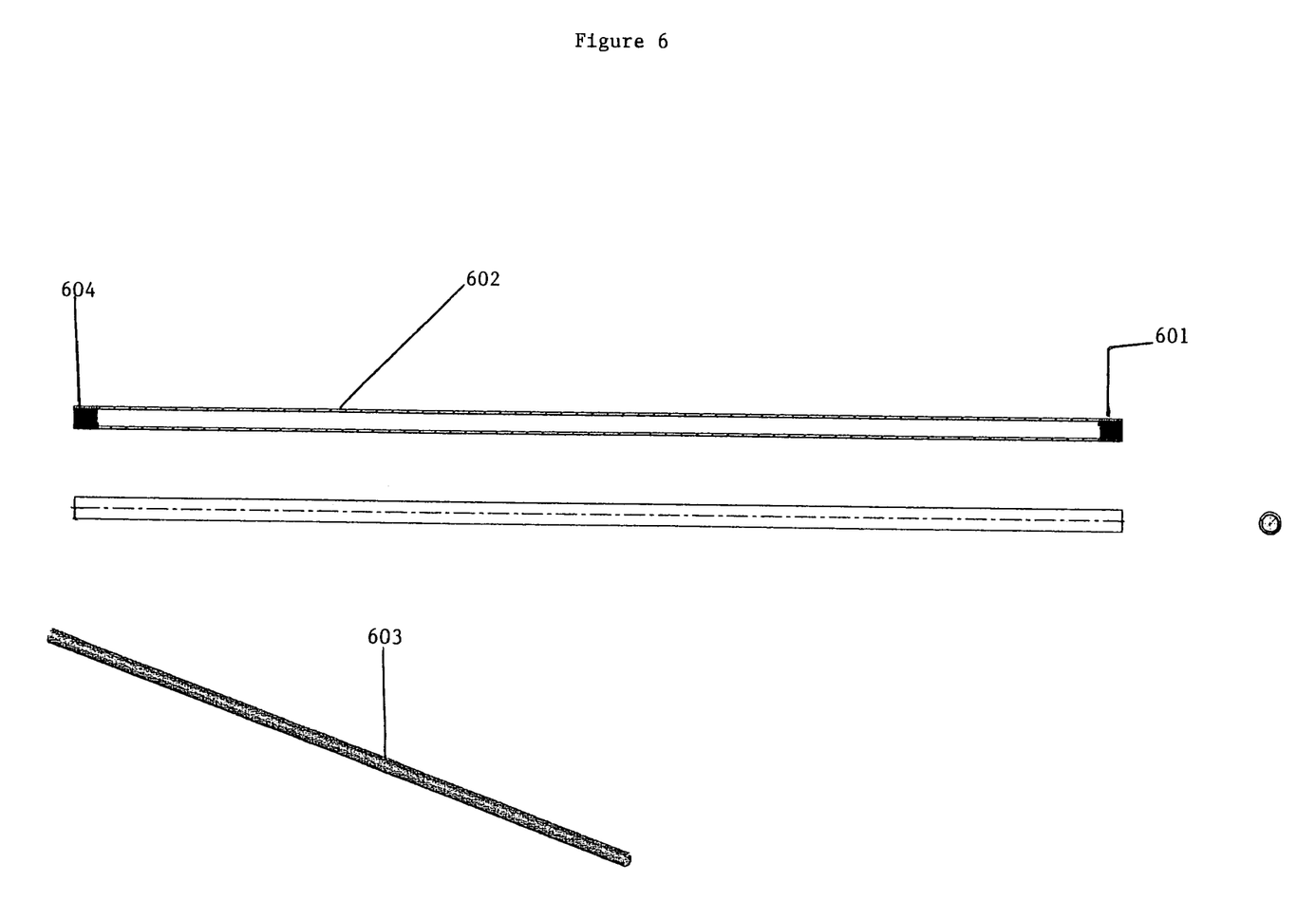
FIG. 6 is a drawing of a harpoon shaft.

The harpoon device (FIG. 1) herein withstands the varying forces generated during hunting and capturing of potentially large, wild and aggressive animals such as fish. The separable components are uncomplicated to operate. Prior types of commercially available harpoons break or fracture in one or more of the coupling regions, as the area acts as a stressor point. However in embodiments of the device herein, the weighted powerhead (FIG. 4) configuration has an externally threaded portion (401) that engages an internally threaded portion of the distal end of a shaft (601). By aligning and firmly mating the recesses of the threaded distal end of the shaft (601) with the proximal end of the head (401) in this fashion, the coupling configuration has greater strength and life of usage than a harpoon device manufactured to have a single segment or dual segments.

Figure 1:
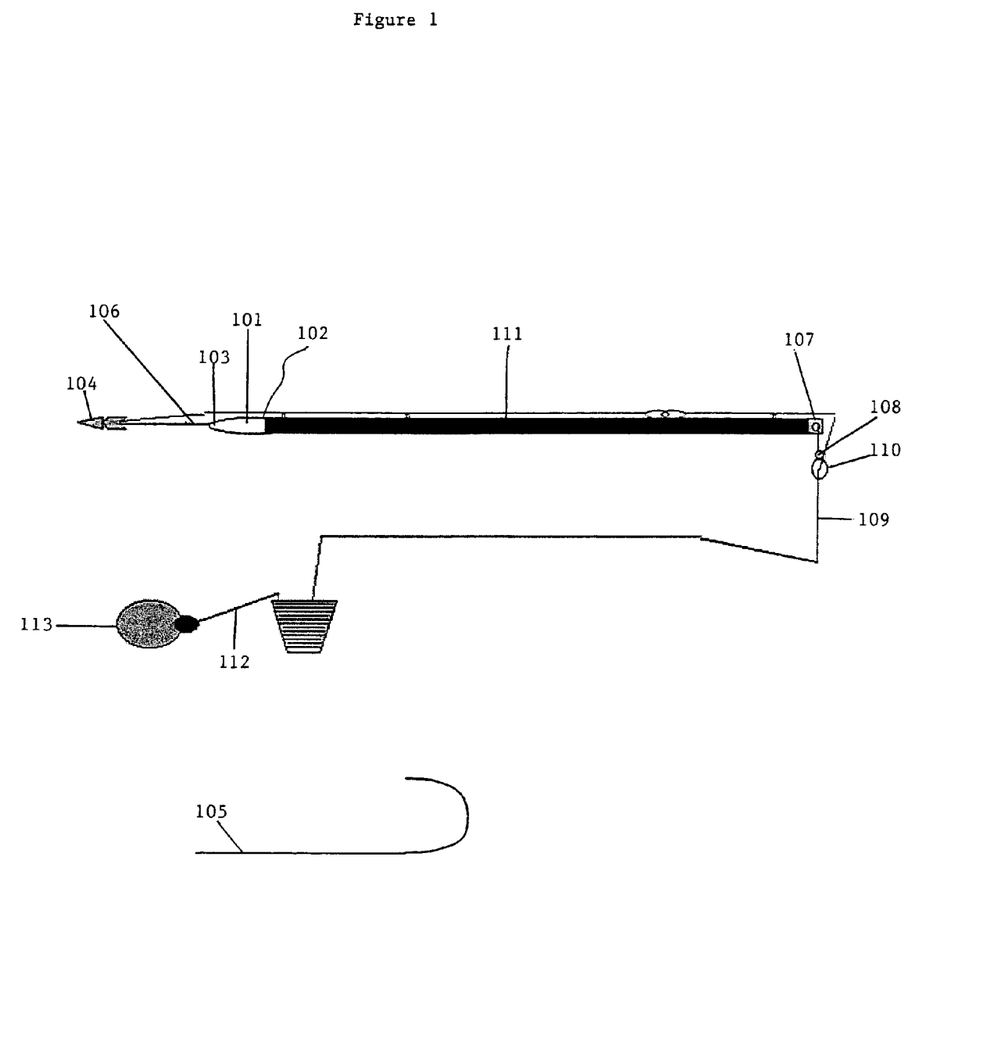
FIG. 1 is a drawing of a harpoon device before being released by a user.

In FIG. 1 use of the endcap (107) is shown for an embodiment of the invention that has a clip (108) for securing a line (109). The clip device (108) has a guide ring (110) that can allow a line (109) to be pulled by a dart (104), a gaff (105), a tag stick, knife, blade, brush or other attachment along side the harpoon shaft (111) in a non-tautened condition. Under certain conditions it is desirable to use a line, rope or cable (109) made or created by heavy-duty nylon, wire, stainless, copper, Dacron or other impact resistant material. When the harpoon (FIG. 1) is released by the user, the line (109) is pulled along by the dart (104) or other attachment and shaft (111) that are pulled by activity of the fish or animal. The user can land a fish without losing contact with the line (109) and then pick up the harpoon (FIG. 1). The rear end of the line (112) is secured to a buoy or other flotation device (113) which provides buoyancy because the harpoon device (FIG. 1) is not buoyant. The buoy (113) may be formed of resilient plastic or foam. The harpoon (FIG. 1) and buoy combination is hurled at an animal target, i.e., is impelled directionally away from the vessel, and the harpoon (FIG. 1) attaches to an animal or sinks from the surface while the line (109) is paid out. After the line (109) has been paid out and recovery of the device is achieved, the line (109) and harpoon device (FIG. 1) are hoisted aboard the fishing vessel with the flotation buoy (113) acting as a visual guide.

Figure 3:
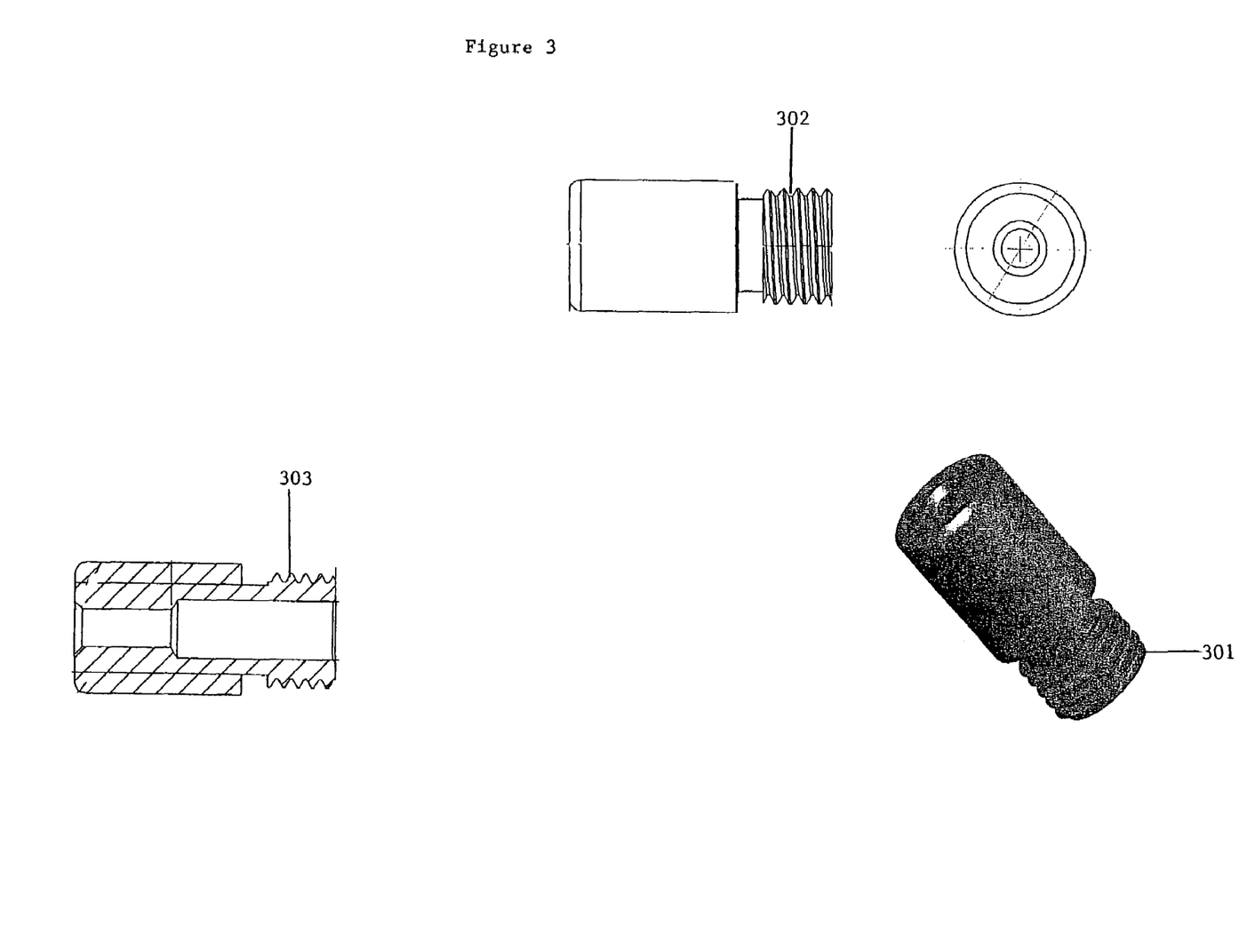
FIG. 3 is a drawing of four views of an end cap.

FIG. 3 illustrates four different perspective views of an end cap (301, 302, 303). As shown, the distal end of the cap (302) has exterior threads for threaded engagement with the proximal end of a shaft (604). The cap (301) is secured to a shaft (602) by positioning the exterior threads of a cap's distal end (302) into the interior threads of a shaft's proximal end cavity (604) and rotating therewith. As with the coupler, the end cap (107) comprises a material selected from the group of brass, chrome, steel, stainless steel aluminum, brass, copper, plastic or fiber and may include an electroplating process to prevent the end cap (FIG. 3) from getting corrosion, rust or other excessive wear.

The powerhead (FIG. 4) is connected to the proximal end of a shank (FIG. 2) and is connected to the distal end of a shaft (601). The shank (FIG. 2) ensures transfer of tension from the dart, gaff, tagging stick, knife, blade, brush or other attachment to the head (101) and shaft (FIG. 2), particularly during penetration of an animal's skin and the subsequent exertion of force and resistance from the animal.

Figure 2:
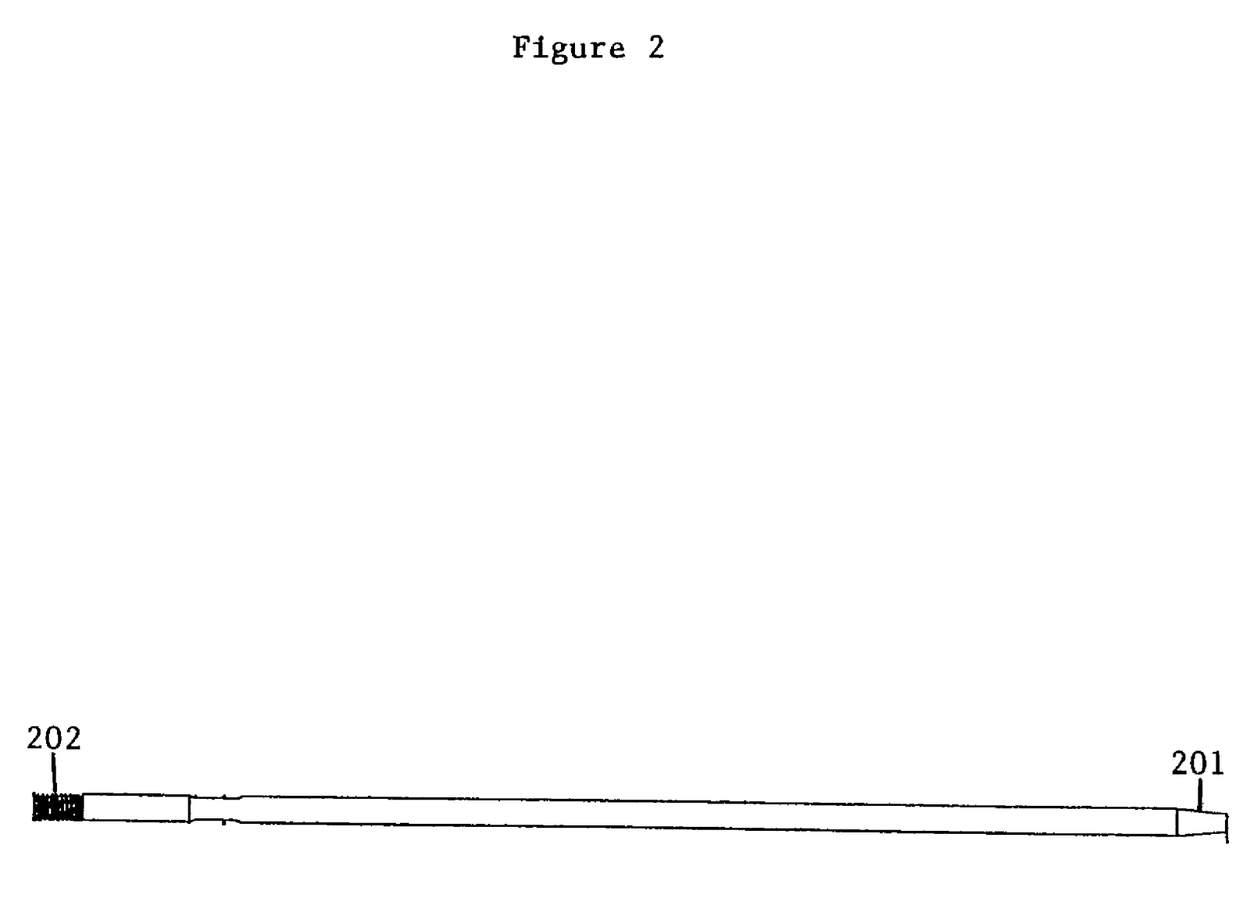
FIG. 2 is a drawing of a view of a shank.

As with the powerhead (FIG. 4) and shank (FIG. 2, 106) components, connecting the proximal end of the shank (202) and the distal end of the head (103) of the device herein is simple and is quickly accomplished by rotating threaded inner surfaces of the proximal end of the shank FIG. 2. The further connections among the harpoon components are similarly effected by mating threaded surfaces, and so are particularly advantageous in withstanding vigorous and unpredictable force inflicted on the device by animals of substantial weight. The same threaded coupling configuration is utilized to link the proximal end of the power head (102) to the distal end of a shaft (111). The versatility of the shank (FIG. 2) in accepting various attachments is advantageous in enabling significant weight bearing, and extending the life of usefulness of the device.

Prior harpoons occupy a relatively large amount of space on a boat, dock or in storage. A user may be disinclined to bring multiple articles of bulky and cumbersome equipment on a vessel, where space is limited, and overloading of limited surfaces may be dangerous.

Prior harpoons that were devised to address this problem include a harpoon with a telescoping body having two hollow tubes that are detachably engaged to each other through the use of a spring detent and series of corresponding holes. See, U.S. Pat. No. 6,883,264 issued Apr. 26, 2005. Such construction, often using rivets, however, displays greater flex at the joints when stressed than is optimal, resulting in unstable construction and weaker joining locations. The harpoons constructed in this manner are found to be insufficiently sturdy to withstand the thrashing and pressure that occur in the nature of intended use. In addition, rivets tend to initiate development of rust, especially with repeated exposure to marine water. Rust decreases ease of assembly, and thereby diminishing convenience of use.

The versatility of the components of the present invention in accepting a variety of attachments is highly advantageous for meeting the operational requirements of use of the device where space is limited. The device provides a multi-segmented shaft by use of which the segments can be quickly and easily screwed together, resulting in an essentially rigid length comparable to a monolithic structure, and are as quickly and easily disassembled. Upon disassembly, the device is quickly and easily placed into a stowed position.

Figure 4:
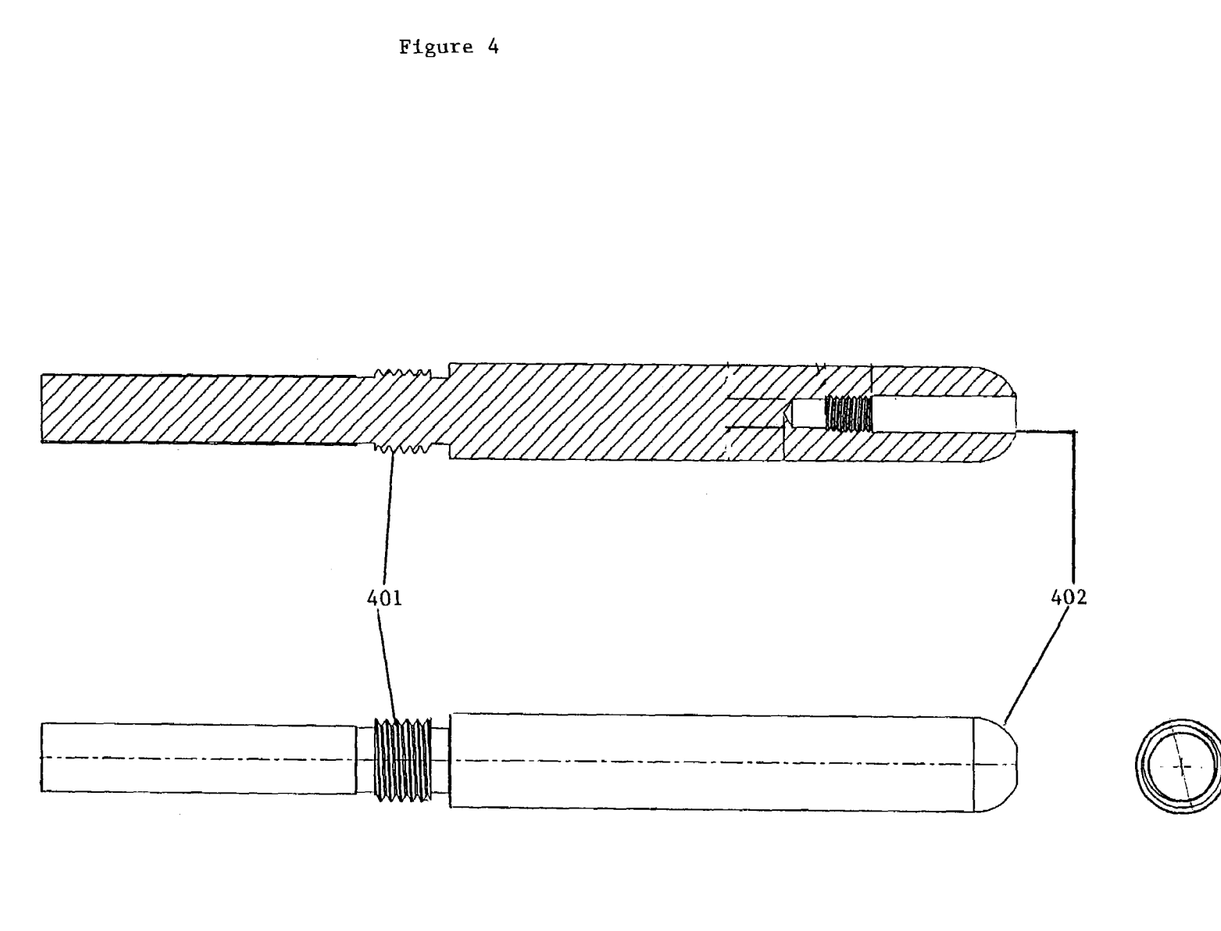
FIG. 4 is a drawing of a harpoon head design.
Figure 5:
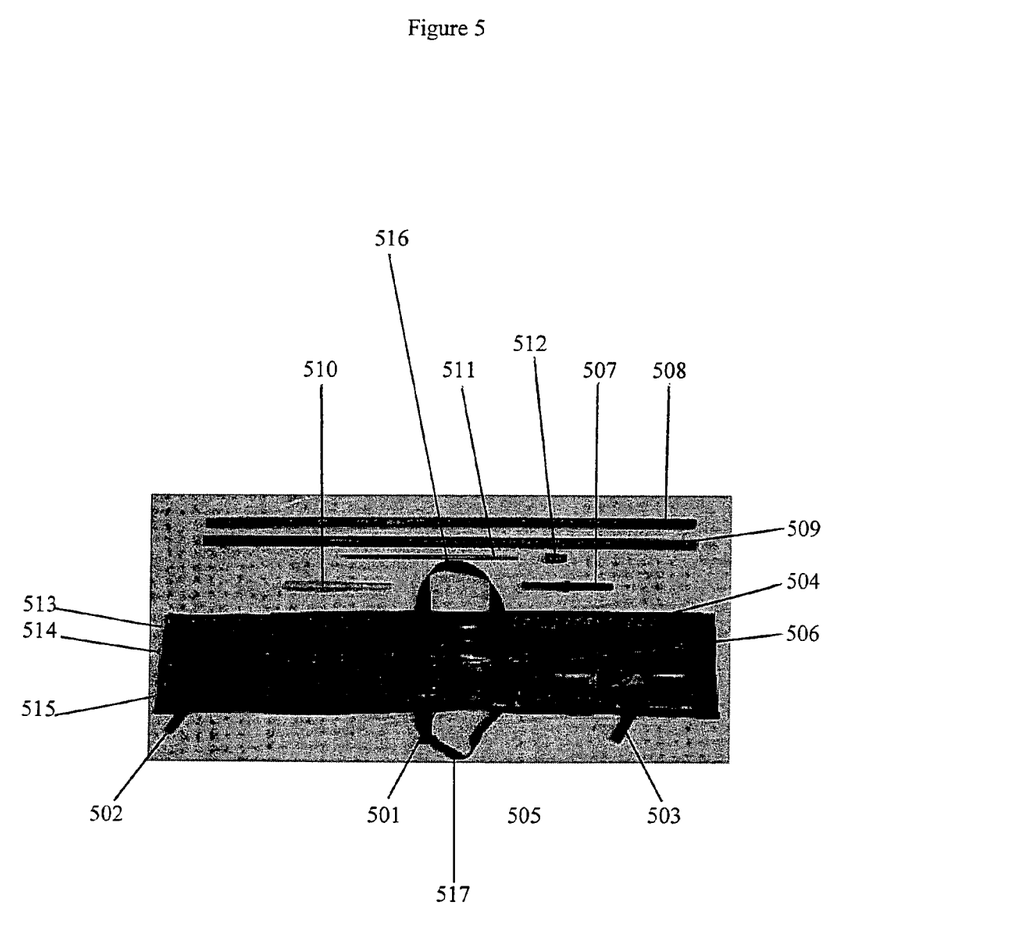
FIG. 5 is a drawing of a top view of a carrying bag.

The invention in various embodiments includes a carrying bag (FIG. 5) that is compartmentalized into a plurality of chambers. Referring to FIG. 5, the center chamber (501) is formed in the shape of the powerhead (FIG. 401) and is secured by one or more closable Velcro-type fasteners (502, 503) to limit movement and maintain even weight distribution, so as to prevent damage to the carrying bag and components in other compartments, (FIG. 5) caused by accidental slippage of the heavy powerhead (FIG. 401) from inside its pocket during transport. According to an embodiment of the carrying bag (FIG. 5), each chamber (501, 504, 505, 506) corresponds in size and shape to each component (504, 507, 508, 509, 510, 511, 512) and is formed in three rows (513, 514, 515). The bag (FIG. 5) is constructed of a flexible, ventilated mesh material for strength and hydration. However, any flexible mesh material such as leather or cloth could be utilized. A user of the carrying bag (FIG. 5) can open the bag (as shown in FIG. 5). Once the carrying bag (FIG. 5) is loaded with components (507, 508, 509, 510, 511, 512), the bag (FIG. 5) can be folded into its closed position and carried by two handles (516, 517) which extend along the center of the bag (FIG. 5).

In addition to economical use of space provided by disassembly of the multiple-segmented shaft of the device (FIG. 6), the availability of interchangeable and reversible long segments (602) and short segments (603) and interchangeable functional units, provides multiple options for use. For example, a user may join more than one short shaft segment (602) or long shaft segment (603), to assemble a dart-rigged harpoon. (FIG. 1). A tall user might select two long segments, while a shorter user might select one long segment and one short segment. Alternatively, a user may utilize a single short shaft segment (602) or a single long shaft segment (603) with a gaff attachment (105), to provide increased leverage to land a fish in close proximity.

The invention in various embodiments further provides a variety of configurations of the harpoon device that permit operation by users of different physical heights, postures, agilities, spans of movement, needs for balance, or overall fishing objectives, by providing means for extending or shortening the harpoon length to maximize suitability.

Previous harpoons include either single piece shafts (U.S. Pat. No. 6,055,761 issued on May 2, 2000), or have multiple components secured by a pin or rivet. A harpoon shown in U.S. Pat. No. 6,789,346 issued on Sep. 14, 2004 includes a connector with a connecting tab for connecting the handle to the shaft, which is not designed to withstand more than minimal pressure.

In contrast to single-shaft harpoons or multiple shaft harpoons fastened by non-screw mechanisms of connections, the coupler provided herein (FIG. 7) uses the highest of tolerances between the inside diameter of the shaft segments (601, 604) and the outer surface of the uniquely designed coupler ends (701).

Figure 7:
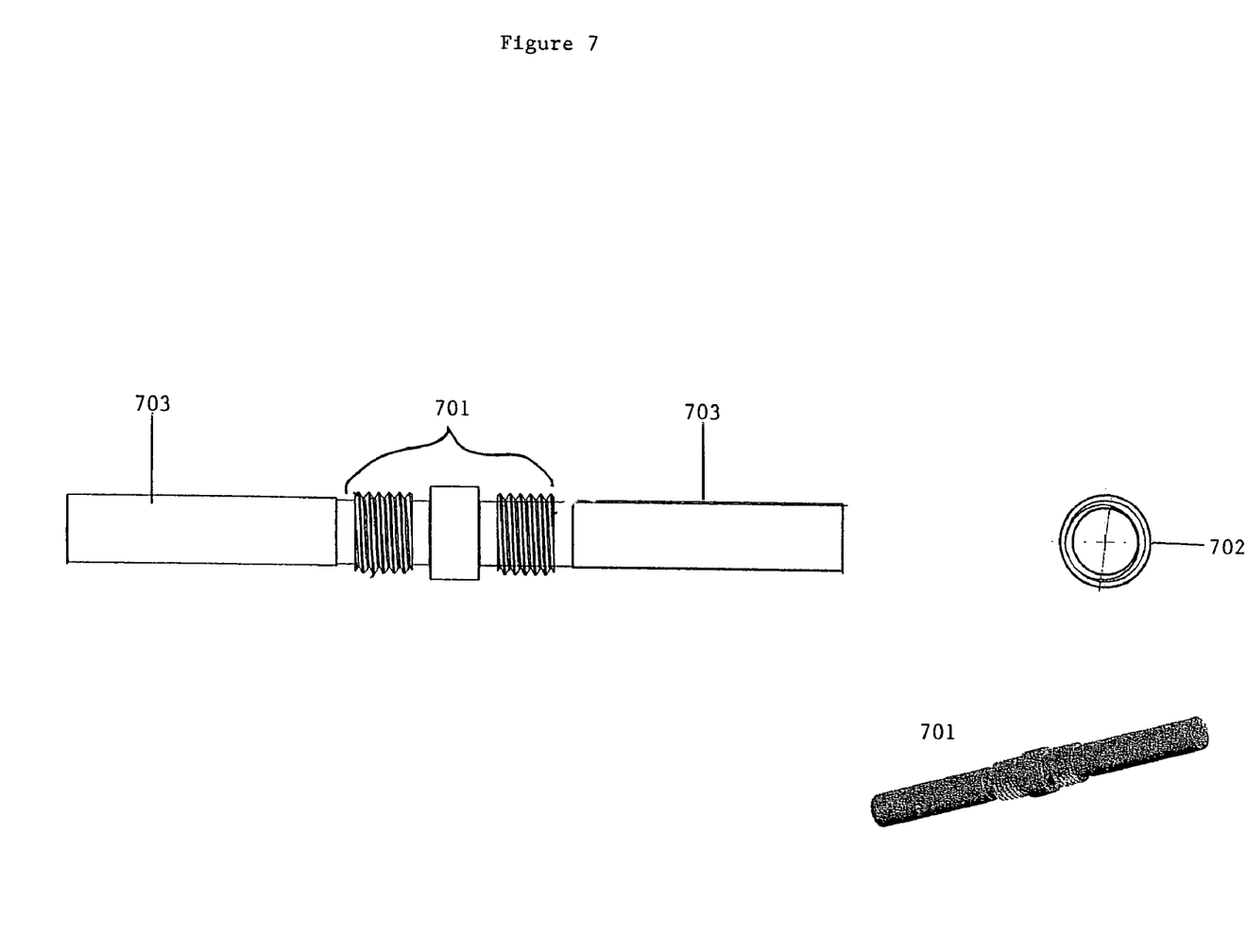
FIG. 7 is a drawing of a coupler of the present invention.

FIG. 7 (701, 702) shows the proportions of total length, threaded portions and circular contour that define an embodiment of the invention. In yet other embodiments, a variety of different dimensions and angles may be used to manufacture length, thread size, degree taper, diameter and numbers of threads per inch if required for a particular application.

The coupler is in the shape of a cylinder (702) with externally threaded portions of similar size surrounding each side of the coupler by the same rotational screw mechanism (701) as connects the aforementioned power head (FIG. 4) and shank (FIG. 2) components. The external surfaces of unthreaded portions (703) extend inwardly into the shaft segments and rest against the internal diameter of each shaft, providing a strong structure that cannot easily be broken. The strength and utility of the harpoon device (FIG. 1) is improved by use of this connecting coupler (FIG. 7) segment.

As with the other components of the invention, the coupler (FIG. 7) is manufactured from metal, such as any grade of steel, stainless steel, aluminum, brass, copper, or from plastic or fiber. In one embodiment, the coupler is manufactured from a machined aluminum which in further embodiments is electro-plated to minimize wear and resist corrosion.

Another problem of prior harpoons is lack of a handle or gripping portion, or presence of a handle or gripping portion of limited or fixed area. In contrast, the shaft segments (602, 603) of the present invention include a rough surface area grip along at least a portion of length of the segment (602, 603). As a result, a user's contact in grasping the device is not limited to any particular section of a shaft segment (602, 603). Unlike prior smooth-surfaced harpoon shafts, the segments of the present invention (602, 603) have longitudinal non-smooth gripping surfaces over the entire circumference of the area, reducing adverse outcomes such as the harpoon being lost at sea or turned loose, especially during sudden actions of great force and resistance from a fish or other animal occurring during the use of the harpoon device.

Under certain conditions, an embodiment of harpoon device, fitted with a knife, blade or other sharp-edged attachment, is placed near an animal or contacts the animal, or is placed against the surface of the animal, or against a net, a line, a hose or other unwanted object, and is used as a cutting device or scraping instrument. For example, the animal might be a right whale, manatee or other endangered animal entangled in a line or hose. The harpoon device herein fitted with a blade can be used to sever the entangled line to release the animal.

In another embodiment, a brush may be attached and secured to the power head (101) and angled by the user against the coat or skin of a large terrestrial or aquatic animal with pressure applied, for the purpose of cleaning, grooming, and/or painting the animal, or removing unwanted debris or tissue from the skin of an aquatic animal, or from fur or coat of a terrestrial animal. For example, an embodiment of the harpoon device herein is fitted with a brush and is used to remove barnacles, parasites, algae or other forms of marine organisms or growth from large terrestrial or aquatic animals, such as those found in zoological exhibits or displays, without having to enter the water to do so.

A skilled person will recognize that many suitable lengths and attachments may be substituted for or used in addition to the configurations described above. It should be understood that the implementation of other variations and modifications of the embodiments of the invention and its various aspects will be apparent to one skilled in the art, and that the invention is not limited by the specific embodiments described herein and in the claims. Therefore, it is contemplated to cover the present embodiments of the invention and any and all modifications, variations, or equivalents that fall within the true spirit and scope of the basic underlying principles disclosed and claimed herein.

What is claimed is:

1. A harpoon device having separable components comprising:
    a functional unit selected from a dart, a gaff, a knife, a blade, a brush, and a tagging stick or other functional tip, and the functional unit is further attachable to a line;
    a shank having a proximal end and a distal end, wherein the distal end of the shank is attachable to the functional unit;
    a power head having a proximal end and a distal end, wherein the distal end of the head is attachable to the proximal end of the shank;
    a coupler threaded on outer surfaces of coupler ends;
    a shaft having a distal end and a proximal end, wherein the distal end of the shaft is attachable to the proximal end of the head, the shaft comprising a plurality of cylindrical hollow shaft segments, wherein each shaft segment is identically threaded on inner surfaces of ends of the shaft segments, each of said ends of the shaft segments being attachable by the coupler threaded on outer surfaces of the coupler ends, wherein an inner diameter of the shaft is sufficiently greater than an outer diameter of the coupler and the coupler joins the shaft segments by a rotational screw mechanism, and wherein the shaft segments are selected from at least one of a long shaft segment and a short shaft segment, and wherein an outer surface of at least one shaft segment of the plurality of shaft segments comprises a rough grip means along at least a portion of its length, wherein the rough grip means is a sandblasted portion of the at least one shaft segment;
    a cap attachable to the proximal end of the shaft, the cap having a clip for securing the line thereto, the clip having a guide ring; and
    a line having first and second ends and an intermediate portion therebetween, the first end of the line being attached to the functional unit, the intermediate portion passing through the guide ring, and the second end of the line being attached to a buoy.

2. The device according to claim 1, wherein attachment of the separable components is free of rivets.

3. The device according to claim 1, wherein the shaft comprises a material selected from the group of: aluminum, titanium, acrylic, stainless steel, and a composite.

4. The device according to claim 1, wherein the head comprises a material selected from the group of brass, chrome and stainless steel.

5. The device according to claim 1, wherein the head weighs at least about 0.5 pound.

6. The device according to claim 1, wherein the short shaft segment is about 2 feet in length.

7. The device according to claim 1, wherein the long shaft segment is about 4 feet in length.

8. The device according to claim 7, wherein the shaft segments comprise two long segments.

9. A method of retrieving an animal from the water using the harpoon device according to claim 1, the method comprising:
    attaching the first end of the line reversibly to the functional unit and thereby the shaft and detachably securing the second end of the line through the guide ring, wherein the line is slidably attached through the guide ring to the buoy for locating the device;
    contacting the animal with the functional unit, wherein the functional unit enters the animal, and wherein a motion of the animal detaches the line from the shaft; and
    retrieving the animal and recovering the harpoon device using the line, wherein the animal is retrieved and the device is recovered.

10. The method according to claim 9, further comprising prior to attaching the line, assembling the device from the components.

11. The method according to claim 10, wherein assembling the device further comprises choosing among the at least one of a long shaft segment and a short shaft segment, wherein a smaller user chooses at least one short segment from long segments and short segments.

* * * * *